United States Patent

[11] 3,587,506

| [72] | Inventor | Sheldon Thompson |
| | | 2187 12 St., Sarasota, Fla. 33577 |
| [21] | Appl. No. | 791,852 |
| [22] | Filed | Dec. 23, 1968 |
| [45] | Patented | June 28, 1971 |

[54] METHODS AND APPARATUS FOR MANIPULATING SUBMERGED OR UNSUBMERGED OBJECTS
22 Claims, 5 Drawing Figs.

[52] U.S. Cl. .................................................. 114/51
[51] Int. Cl. .................................................. B63c 7/02
[50] Field of Search ................................... 114/51, 50; 61/69

[56] References Cited
UNITED STATES PATENTS
1,916,294  7/1933  Bacinich ........................ 61/69
2,347,491  4/1944  Lente ........................... 114/51
3,339,513  9/1967  Cloutier ........................ 114/50

FOREIGN PATENTS
359,763  10/1905  France .......................... 114/51

Primary Examiner—Andrew H. Farrell
Attorney—Beveridge & DeGrandi

ABSTRACT: A method and apparatus for manipulating an object, including the use of a chuck positioned in engagement with the object. Compressed gas is introduced by control valves through conduits to purge the interior of the conduits and the chuck. The pressure in the interior of the chuck is then relieved or reduced in order to create a pressure differential across the chuck sufficient to secure the chuck to the object. The chuck secured to the object is then moved by conventional manipulating equipment connected to the chuck.

PATENTED JUN 28 1971 3,587,506

INVENTOR
SHELDON THOMPSON

BY Browne, Schuyler & Beveridge.
ATTORNEYS

INVENTOR
SHELDON THOMPSON

BY Browne, Schuyler & Beveridge
ATTORNEYS

METHODS AND APPARATUS FOR MANIPULATING SUBMERGED OR UNSUBMERGED OBJECTS

BACKGROUND OF THE INVENTION

This invention relates to an improved method and apparatus for manipulating an object which is either submerged or unsubmerged.

In one conventional method of recovering sunken objects, such as exemplified in U.S. Pat. No. 2,347,491 to Lente, a vacuum chuck is submerged into engagement with a sunken object, and a pump attached to the chuck is employed to withdraw the water from the chuck to establish the pressure differential required to secure the chuck to the object for raising the object.

Lente's method is susceptible to maintenance and operating problems when employing pumping components which are mounted on the chuck and submerged. When the pumps in Lente's method are located on pontoons at the surface of the water, the work of the pump is described by Lente as greater because of the column of water between the chuck and the pump. Also in Lente's method the gripping force of the chuck itself is limited by the pressure of the surrounding water, thus restricting the practical utility of the chuck to subsurface application affording adequate hydrostatic pressures.

An object of the present invention is to provide a method and apparatus for manipulating an object in a manner which improves upon such features as those noted above.

A specific object of the present invention is to provide a method and apparatus for manipulating a submerged object using pressure-manipulating apparatus principally located accessibly and out of contact with the water.

Another specific object of the present invention is to provide a method and apparatus for manipulating an object using pressure-manipulating apparatus which can be positioned in a surface vessel or a submersible vessel for versatile use at or under the surface of the water.

Yet another object of the present invention is to provide a method and apparatus for manipulating an object which eliminate the necessity for pumping water from the object to the surface of the water in which the object may be submerged.

A further object of the present invention is to provide a method and apparatus for manipulating an object with simplicity, efficiency, and economy, using standard components which are readily available and serviceable.

SUMMARY OF THE INVENTION

The above objects are achieved by the use of a chuck which may be used above water, or submerged into engagement with the surface of a sunken object. When attaching the chuck to a submerged object, compressed gas is introduced into the chuck through conduits from a compressed gas source located above the surface of the water, or located in a vessel at or below the surface of the water, to purge the chuck of water. Alternatively, the chuck may be used for engagement with an object above the surface of water, which object is to be placed or positioned above or beneath the surface of the water.

When initial engagement of chuck and object is beneath the surface of the water, after engagement the water is purged from the interior of the chuck by introducing compressed gas through conduits to the interior of the chuck to blow the water therefrom. The pressure inside the chuck is then relieved by termination of the introduction of compressed gas, and by simultaneous communication of the interior of the chuck, through conduits, with a vacuum source, or with atmospheric pressure above the surface of the water, or with the interior of a submersible vessel, thus providing a pressure differential across the chuck and a resultant securing of the chuck to the object. When the chuck is used in water of insufficient depth to maintain the required pressure differential across the chuck, or when the object initially engaged in deep water has been raised by the secured chuck to water depth at which there is insufficient hydrostatic pressure to maintain the necessary pressure differential across the chuck for securing the chuck to the object, then venting of the interior of the chuck to atmospheric pressure, or to the interior of a submersible vessel, is not used, or is terminated, and evacuated of the interior of the chuck is accomplished through its communication with the vacuum source. Check valves can be used, as described hereinbelow, so that repeated purging of water from the chuck and conduits can be achieved if necessary while the chuck remains secured to the object.

When initial engagement of the chuck and object is above the surface of the water, then the initial purging of water from the chuck and conduits by the introduction of compressed gas is generally unnecessary, and the interior of the chuck is, on initial engagement of the chuck with the object, connected through conduits to the vacuum source to achieve the pressure differential required for securing the chunk to the object. If the secured chuck and object are then lowered to water depths sufficient to maintain the required pressure differential across the chuck by atmospheric or submersible vessel pressure venting, such venting can be used and the vacuum source cut off.

Conventional hoisting and manipulating equipment, such as a cable and winch, are connected to the chuck for lifting and manipulating the chunk and the secured object.

DESCRIPTION OF THE DRAWINGS

Other objects and features of the invention will become apparent from the following more detailed description wherein reference is made to the accompanying drawings in which.

DESCRIPTION OF THE PREFERRED EMBODIMENT

Figure 1:
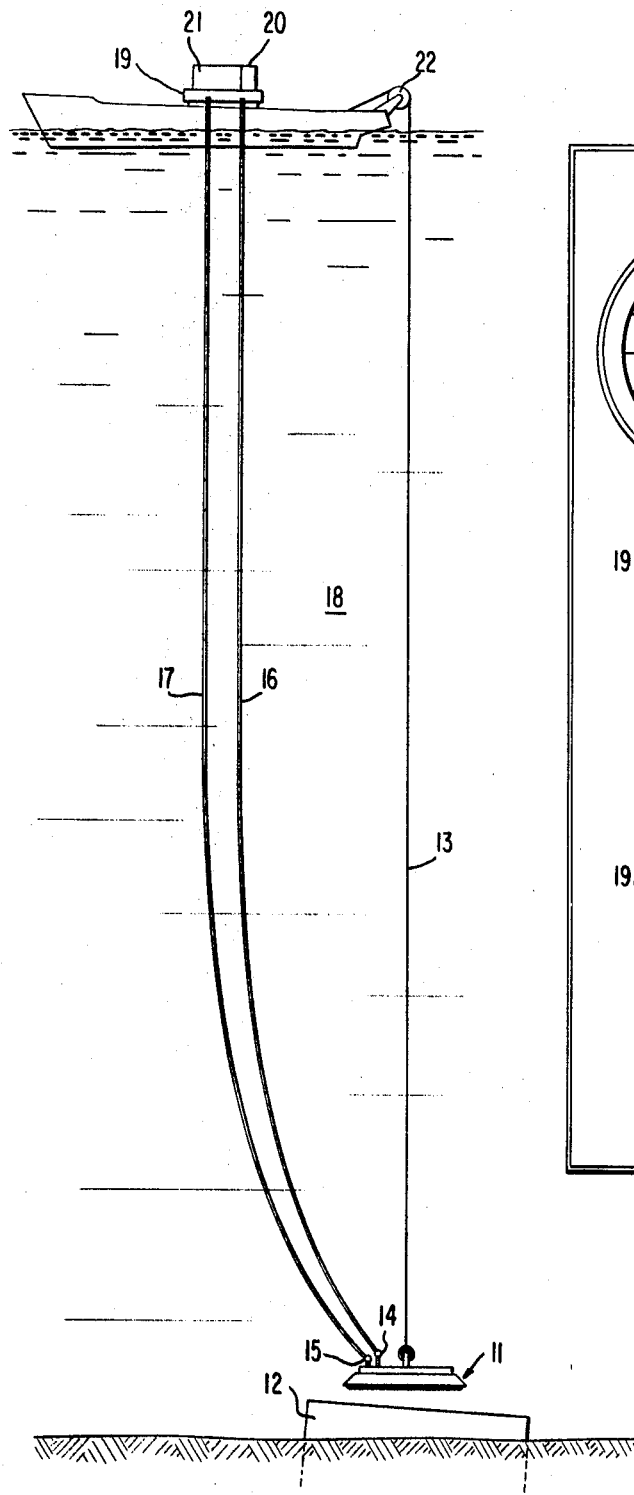
FIG. 1 is a schematic profile view of the placement and recovery apparatus incorporating the invention and showing its manner of use.

Referring now to the drawings, there is shown an apparatus for manipulating object 12 submerged in a body of water 18 by use of a vacuum chuck 11. In order to initially attach chuck 11 to submerged object 12, chuck 11 is first positioned in engagement with the surface of the submerged object 12, as shown in FIG. 1; and gas, preferably air, under sufficient pressure to purge the water from the interior of submerged chuck 11, is introduced from compressed gas source 21 through conduit 17 into the interior of chuck 11, and through conduit 16 and check valve 11B as amplified below. Valving and pressure control details will be described below. The compressed gas source 21 is preferably a high pressure tank or reservoir which may be located on a vessel above the surface of the water 18 or submerged in a suitable vessel below the surface of the water. After water is purged from submerged chuck 11, pressure control valve 19B is operated to terminate the introduction of compressed gas into the interior of chuck 11 through conduit 17, and simultaneously control valve 19A is operated to communicate conduit 16 with vacuum source 20, in order to create a pressure differential across chuck 11 sufficient to secure the chuck to submerged object 12. Check valves 11A and 11B function, as explained below, so that repeated purging of water from chuck 11 and conduits 16 and 17 can be accomplished if necessary while chuck 11 remains secured to object 12.

When initial engagement of chuck 11 and object 12 is above the surface of water 18, then the initial step of purging water from chuck 11 and conduits 16 and 17 by the introduction of compressed gas from compressed gas source 21 is generally unnecessary, and the step of venting the interior of chuck 11 through conduit 16 to atmospheric pressure is not used. Instead, the interior of chuck 11, on engagement with object 12, is maintained in communication with vacuum source 20, through conduit 16, to achieve the pressure differential required for securing chuck 11 to object 12. If chuck 11 and object 12 are then lowered in water 18 to depths sufficient to maintain the required pressure differential across chuck 11 by venting the interior of chuck 11 through conduit 16 to atmospheric pressure, then atmospheric pressure can be so introduced, and vacuum source 20 shut off.

A conventional hoisting cable 13 and conventional winch 22 are connected to chuck 11 for lifting chuck 11 and the secured object 12.

Figure 4:
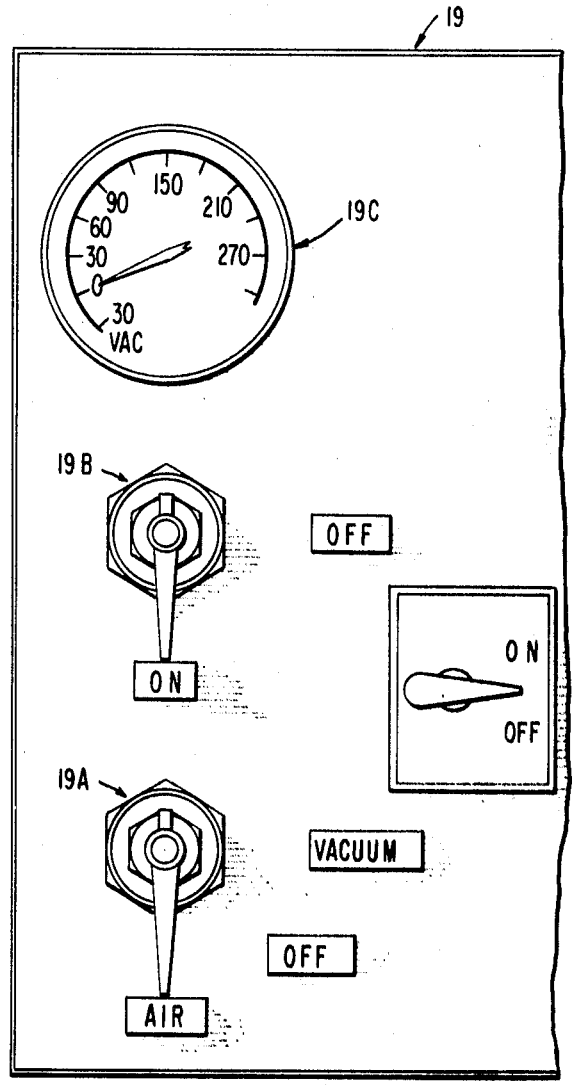
FIG. 4 is a schematic view of the chuck pressure control panel showing the pressure and vacuum controls and indicators.
Figure 2:
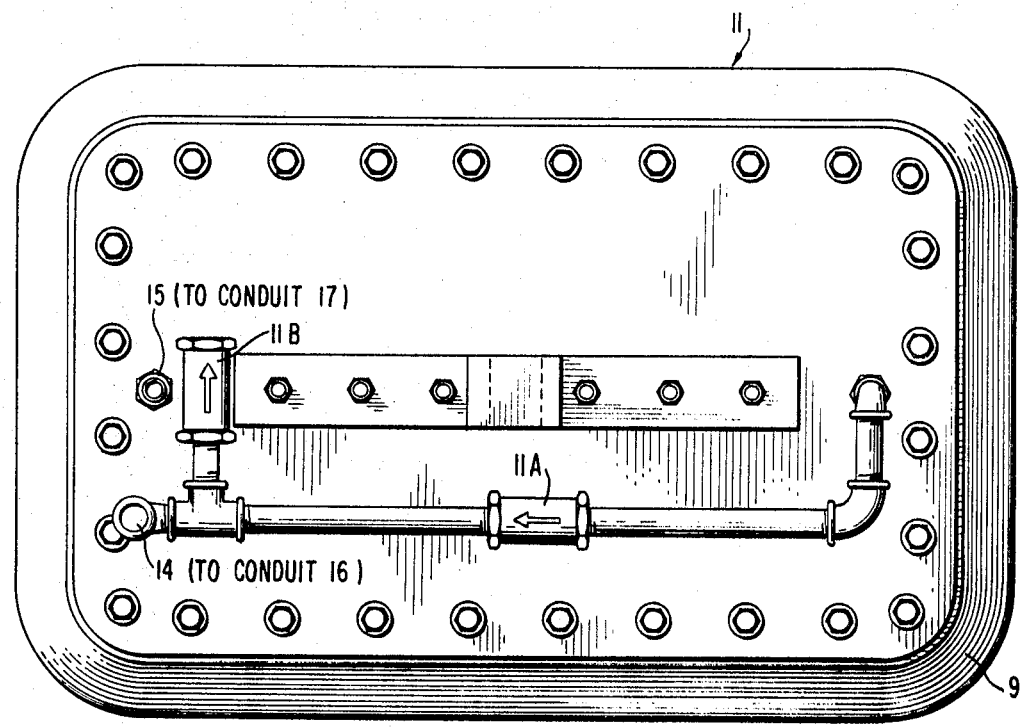
FIG. 2 is a top plan view of the chuck used in this invention showing the conduit connections and check
Figure 3:
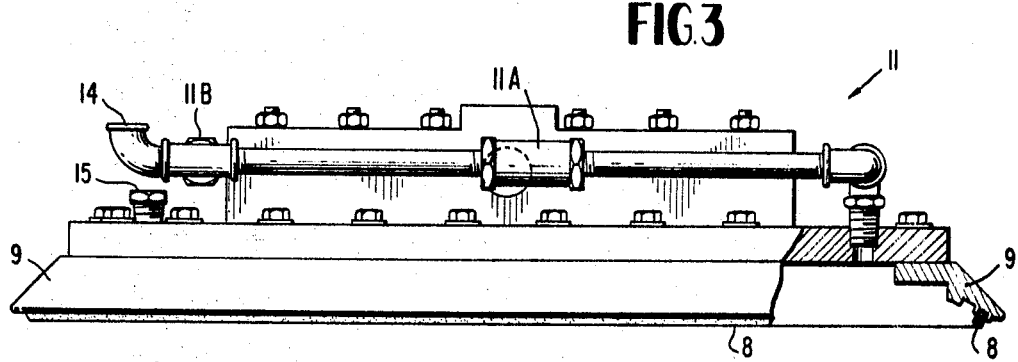
FIG. 3 is an elevation view, partially in section of the chuck showing the conduit connections and check valves.
Figure 5:
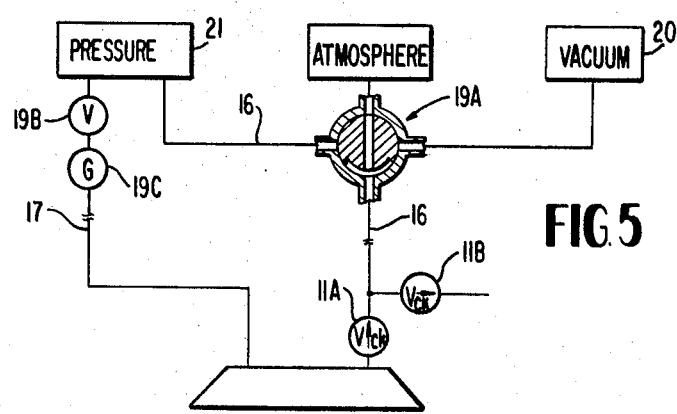
FIG. 5 is a schematic view of the chuck pressure and vacuum control system.

Control of the pressure within chuck 11 is illustrated in FIGS. 4 and 5, as correlated with FIGS. 2 and 3. Control valve 19A controls the pressure in conduit 16; control valve 19B controls the pressure in conduit 17; and gauge 19C indicates the pressure in conduit 17 and the interior of chuck 11. When chuck 11 is used to lift a submerged object 12, upon positioning chuck 11 in engagement with the surface of submerged object 12, control valve 19A is placed in the "air" position to direct gas under pressure through conduit 16, and out through check valve 11B as amplified below, to purge conduit 16; and control valve 19B is placed in the "on" position to direct gas under pressure through conduit 17 and chuck 11 to purge water therefrom. Control valve 19B is preferably a conventional quick-acting valve, while control valve 19A is three-position, four-way valve operable to selectively connect conduit 16 to atmosphere, vacuum source 20, or compressed gas source 21.

Conduit 17 is connected to chuck 11 through chuck connection 15 which leads the compressed gas from conduit 17 directly into the interior of chuck 11, to purge or blow water out of the interior of chuck 11 under chuck skirt lip 8. Conduit 16 is connected to chuck 11 through an adapter assembly 14 including a one-way check valve 11B having an open discharge through check valve 11B. Check valve 11B is thus forced open by the passage of the compressed gas, while check valve 11A is similarly forced closed, thus purging any water collected in conduit 16. After this purging operation, control valve 19B is placed in the "off" position which terminates the introduction of compressed gas into conduit 17.

Control valve 19A is moved to the "vacuum" position to reduce the pressure to evacuate conduit 16, chuck 11, and, through the interior of chuck 11, conduit 17. Gauge 19C should then indicate this reduction in pressure throughout the system. However, if water is trapped in the system, the water level in line 16 will be higher than the water level in line 17 when vacuum is applied to line 16. This water differential will be indicated by a differential in the pressure at gauge 19C. Under such conditions, line 16 can be purged by maintaining control valve 19B in the "off" position, and moving control valve 19A to the "air" position to force the water from conduit 16 through check valve 11B, while check valve 11A prevents the compressed gas in conduit 16 from entering the interior of chuck 11.

After purging line 16, control valve 19A is returned to the vacuum position. By repetition of this purging process, the system can be completely purged of water without losing the secure grip of chuck 11 upon object 12. Vacuum can be used in conduit 16 at all depths to pull any water in conduit 17 or the interior of chuck 11 into conduit 16 so that purging can be accomplished as described above.

When chuck 11 is at sufficient depths of water, control valve 19A can be used in the "off" position. This vents conduit 16 to atmospheric pressure above the surface of water 18. At sufficient water depths the hydrostatic pressure is thus great enough to provide the pressure differential required for securing chuck 11 to object 12.

When chuck 11 is used to grip an object above the surface of water 18, and place it in water 18, the appropriate procedure for gripping and lifting the object is followed, as described above. Thereafter, when object 12 is lowered into water 18 and placed where desired, the chuck may be released by moving control valve 19B to the "on" position, and control valve 19A to the "air" position. Thus, compressed air is reintroduced into the interior of chuck 11 through conduit 17, releasing chuck 11 from the surface of object 12.

It will be observed from the foregoing description and associated drawings that the principal pressure-manipulating components can be located above the surface of the water, or in a submersible vessel at or below the surface of the water for mobile and diversified use, and ease of maintenance and operation. Standard components in combination can be employed; and the necessity of pumping water from within the interior of the chuck up to the surface of the water in which the object is submerged is eliminated.

Although the invention has been shown and described in a particular embodiment, other embodiments can be employed using these same inventive concepts. Modifications and adaptations of the present invention, which are readily apparent from the foregoing description and associated drawings, although not specifically mentioned herein, will nevertheless be included within the scope of the present invention as indicated in the appended claims. For example, a plurality of chucks and controls, as described above, can be used on a single object in the same placement and recovery system.

I claim:

1. A method of manipulating an object with a vacuum chuck comprising the steps of: placing a chuck in engagement with the surface of the object to form a chamber closed by said surface, purging substantially all of the water from said chamber by introducing a gas into said chamber under pressure greater than the ambient pressure surrounding said chuck, stopping said purging, reducing the pressure in said chamber below the pressure surrounding said chuck to create a pressure differential across said chuck sufficient to produce a seal between said chuck and said surface to thereby secure said chuck to the object, and moving the chuck to manipulate the object.

2. The method defined in claim 1, wherein said gas is introduced through communication means from a compressed gas source.

3. The method defined in claim 1, wherein the object is submerged in water and wherein the pressure in said chamber is reduced by placing said chamber in communication with atmospheric pressure.

4. The method defined in claim 1, wherein the object is submerged in water and wherein the pressure in said chamber is reduced by placing said chamber in communication with the interior of a submersible vessel.

5. The method defined in claim 1, wherein the pressure in said chamber is reduced by placing said chamber in communication with a vacuum source.

6. The method defined in claim 1, further including the step of increasing the pressure in the chamber to release the chuck from the object.

7. The method defined in claim 2, wherein the object is submerged in water and said compressed gas source is positioned above the surface of the water.

8. The method defined in claim 2, wherein the compressed gas source is positioned in a submersible vessel.

9. The method defined in claim 5, wherein the object is submerged in water and said vacuum source is positioned above the surface of the water.

10. The method defined in claim 5, wherein said vacuum source is positioned in a submersible vessel.

11. The method defined in claim 5, wherein said vacuum source is connected to said chamber by a vacuum conduit, said method further including the steps of purging said conduit between said vacuum source and said chamber while maintaining the reduced pressure in said chamber.

12. A method of attaching a vacuum chuck to an object submerged in water, the vacuum chuck having two conduit lines leading into its interior, the steps comprising: placing the chuck on a surface of the object with the interior of the chuck and the surface of the object defining a chamber, introducing a gas under pressure into the interior of the chuck through one of the lines to purge water from the chamber, reducing the pressure in the chamber through the other line to draw any water remaining in said one line and said chamber into the other line, closing said other line at a point adjacent the chuck, and introducing a gas under pressure into said other line to purge the other line of water through a vent passage therein.

13. The system defined in claim 12, wherein the step of reducing the pressure in the interior of the submerged chuck comprises the step of communicating the interior of said chuck with atmospheric pressure above the surface of the water.

14. The system defined in claim 12, wherein the step of reducing the pressure in the interior of the submerged chuck comprises the step of communicating the interior of said chuck with the interior of a submersible vessel.

15. The system defined in claim 12, further including the step of increasing the pressure in the interior of said chuck to release said chuck through said one line from the object.

16. The method defined in claim 12, wherein the pressure in the chuck is reduced by applying a vacuum to the interior of the chuck through said other line.

17. A system for manipulating an object, the system comprising in combination, a chuck adapted to be positioned in engagement with the surface of the object to form a chamber closed by the surface and the chuck, means including a first conduit communicating with the interior of the chuck and a source of compressed gas for introducing into the interior of the chuck compressed gas to purge water from said chamber, a second conduit having a portion communicating with the interior of said chuck, means including said second conduit for reducing the pressure within said chamber below the ambient pressure surrounding said chuck to create a pressure differential across said chuck sufficient to secure said chuck to the object, the valve control means operatively connected to said first and second conduits for closing communication between said source of compressed gas and said chamber and for establishing communication between said chamber and said means for reducing the pressure within the chamber, a first check valve means positioned in said second conduit adjacent said chuck for permitting fluid flow out of said chuck interior into said second conduit but preventing return flow from said second conduit into the chuck interior, a second check valve means located between said first check valve means and said valve control means for venting said second conduit of water, said valve control means further being operable to place said compressed gas source into communication with said second conduit for purging water from said second conduit through said second check valve means.

18. The apparatus as defined in claim 17, wherein said conduits is operable to release said chuck from the object.

19. Apparatus as defined in claim 17, wherein said object is submerged in water, and the means for reducing the pressure within the chamber includes means for communicating the chamber with atmospheric pressure above the surface of said water.

20. Apparatus as defined in claim 17, wherein said object is submerged in water, and the means for reducing the pressure within the chamber includes means for communicating the chamber with the interior of a submersible vessel.

21. Apparatus as defined in claim 17, wherein the means for reducing the pressure within the chamber includes a vacuum source.

22. Apparatus for the manipulation of an object, comprising in combination:
  a. a vacuum chuck;
  b. a compressed gas source;
  c. at least one gas pressure conduit communicating the chuck with the compressed gas source;
  d. means for closing the gas pressure conduit intermediate the chuck and the compressed gas source;
  e. means for measuring the pressure in the gas pressure conduit intermediate the chuck and the means for closing the gas pressure conduit;
  f. a vacuum source;
  g. at least one evacuation conduit operatively connecting said chuck, said compressed gas source, and said vacuum source;
  h. control valve means connected in said evacuation conduit, said valve means being operable to selectively communicate said chuck with said compressed gas source, said vacuum source, and with atmospheric pressure;
  i. first check valve means operatively connected in said evacuation conduit adjacent said chuck for discharging fluid under pressure from said evacuation conduit, and for preventing flow back into the evacuation conduit from outside the evacuation conduit;
  j. second check valve means operatively connected in said evacuation conduit intermediate said first check valve means and the chuck, to prevent the flow of fluid from the evacuation conduit into said chuck when compressed gas is introduced from the compressed gas source into the evacuation conduit, said second check valve means being operable to communicate the interior of the chuck with the evacuation conduit when said chuck is in communication with said vacuum source or with atmospheric pressure.